(12) United States Patent
Koguchi et al.

(10) Patent No.: US 6,503,436 B1
(45) Date of Patent: Jan. 7, 2003

(54) MOLD FOR USE IN METHOD FOR PRODUCING A HARNESS

(75) Inventors: Yasuyuki Koguchi, Tokyo (JP); Shigeo Ueki, Tokyo (JP)

(73) Assignee: DDK Ltd., Tokyo (JP)

( * ) Notice: Subject to any disclaimer, the term of this patent is extended or adjusted under 35 U.S.C. 154(b) by 0 days.

(21) Appl. No.: 09/480,247

(22) Filed: Jan. 11, 2000

(30) Foreign Application Priority Data

Jan. 11, 1999 (JP) .......................................... 11-003824

(51) Int. Cl.[7] .................... B29C 33/12; B29C 33/42; B29C 33/76; B29C 39/10; B29C 45/14
(52) U.S. Cl. ................. 264/277; 264/278; 425/121; 425/123; 425/125; 425/577
(58) Field of Search ............................. 264/271.1, 275, 264/277, 278, 263, 272.14, 272.15; 425/116, 121, 123, 125, 577

(56) References Cited

U.S. PATENT DOCUMENTS

| | | | |
|---|---|---|---|
| 4,954,307 A | * | 9/1990 | Yokoyama .............. 264/272.15 |
| 5,182,032 A | * | 1/1993 | Dickie et al. .................. 249/91 |
| 5,372,767 A | * | 12/1994 | Zimmermann et al. ...... 264/154 |
| 5,527,502 A | * | 6/1996 | Kiuchi et al. ................ 264/250 |
| 5,639,403 A | * | 6/1997 | Ida et al. ..................... 264/255 |
| 5,972,270 A | * | 10/1999 | Furuya et al. .......... 264/272.15 |
| 6,063,321 A | * | 5/2000 | Koyama et al. ............. 264/404 |
| 6,071,446 A | * | 6/2000 | O'Brien et al. ............. 264/261 |
| 6,074,591 A | * | 6/2000 | Privett ......................... 264/278 |
| 6,319,451 B1 | * | 11/2001 | Brune ......................... 264/278 |

* cited by examiner

Primary Examiner—Angela Ortiz
(74) Attorney, Agent, or Firm—Baker Botts L.L.P.

(57) ABSTRACT

Contacts connected to wires are set in a lower mold and an upper mold is then fitted on the lower mold. The upper and lower molds include contact restraining portions and wire restraining portions, and upper mold holding members and lower mold holding members extending into the cavity at opposite positions enabling these holding members to restrain the wires. The upper and lower molds further include elastic members arranged to urge the upper and lower mold holding members into the cavity of the upper and lower molds for restraining the wire before an insulating plastic material is poured into the cavity. Either of the upper and lower mold is provided with a contact positioning portion adapted to abut against distal ends of the contacts for positioning the contacts relative to the molds. Under closed condition of the molds, an insulating plastic material is poured into the cavity of the molds, while the upper and lower mold holding members are forced away from the wires out of the plastic material by the pressure of the plastic material being poured into the cavity. The plastic material is then cooled or heated so as to be solidified or hardened. After solidification, the upper mold is removed from the lower mold and the harness comprising the contacts and wires held and fixed in the plastic material is then taken out of the lower mold.

4 Claims, 4 Drawing Sheets

MOLD FOR USE IN METHOD FOR PRODUCING A HARNESS

BACKGROUND OF THE INVENTION

This invention relates to a method for producing a harness of a connector for connecting between electric appliances and the like and a mold for use in the method, and more particularly to an improved method for holding wires in producing a harness of a connector.

A hitherto used method for producing a harness of an electrical connector by the use of the insert-molding will be explained by referring to FIG. 3A illustrating a harness 50 of the prior art in a perspective view, FIG. 3B illustrating a mold in section during insert-molding, FIG. 4A showing a harness having a defect in a perspective view, and FIG. 4B illustrating a mold in section causing such a defect in the harness.

The term "harness" used herein is to be understood as an assembly of contacts, wires or the like aligned in a unit with the aid of an insulator in order to facilitate to operate them.

The term "insert-molding" is one molding method in that after members have been arranged in a mold, a molten material is poured into the mold to obtain a unitarily molded article having the members embedded therein.

The harness 50 mainly consists of an electrical insulator 52, metallic contacts 14 and wires 16. The wires 16 are connected to the respective contacts 14 by means of solderless joining or piercing. A desired number of the contacts 14 connected to the wires 16 are fixed in the electrical insulator 52 by means of the insert-molding.

Materials for the insulator 52 are required to have a good flowability when being poured into a mold, and examples of such materials include liquid crystal polymer (LCP), polyamide (PA66) and the like. The liquid crystal polymer (LCP) is preferable in consideration of heat resistance and moldability.

The insert-molding for molding the harness 50 will be explained by referring to FIG. 3B. The illustrated mold consists of an upper mold 18 and a lower mold 20. The upper mold 18 has a resin pouring inlet 30 as shown in dash-dot lines in FIG. 3B for pouring a resin into a cavity of the upper and lower molds after these molds have been clamped. Each of the upper mold 18 and the lower mold 20 may be of a one-piece mold structure, but molds separable along the broken lines may be preferable because of ease in fabrication.

In molding, the contacts 14 connected to the wires 16 are set in predetermined positions in the lower mold 20. The upper mold 18 is then put on the lower mold 20, and the upper and lower molds 18 and 20 are clamped. On being clamped, the contacts 14 and the wires 16 are securely restrained respectively by contact restraining portions 24 and wire restraining portions 40 formed in the upper and lower molds to avoid any possible leakage of a molten resin. A clearance between the contacts and the contact restraining portions is of the order of 0.02 mm in order to prevent the contacts from being damaged and to avoid the leakage of the resin.

Thereafter, a molding resin is poured through the resin pouring inlet 30 into the cavity. After solidification of the resin, the molds are opened and the harness 50 is manually or automatically removed therefrom.

In the insert-molding of the prior art described above, in general, a tensile force has been applied to the wires during the insert-molding, in order to prevent the wires from slacking or bending because in the cavity the wires 16 are longer than the contact 14. On the other hand, however, a compressive force has been applied from the wire 16 onto the contact 14 in the direction shown by an arrow C in FIG. 4B, in order to position the distal ends of the contacts 14 with high accuracy or to align the distal ends of the contacts 14 in a straight line perpendicular to the longitudinal axes of the contacts 14.

In such a procedure, as in the cavity the wires 16 are usually longer and more flexible than the contacts, the wire 16 would often be deformed or bent upon being subjected to the compressive force as shown in FIG. 4B or subjected to the pressure of the molding resin poured into the cavity. As a result, part of the coating of the wire 16 exposes at the surface of the insulator 52 as shown at reference numeral 44 in FIG. 4A, which is a problem to be solved. Such a harness with an exposed wire could not be used and would be discarded, resulting into increased cost of fabrication.

SUMMARY OF THE INVENTION

It is an object of the invention to provide an improved method for producing a harness and an improved mold for use in the method, capable of easily and accurately positioning the distal ends of contacts without exposing part or parts of wires at the surface of the harness.

In order to accomplish the above object, in the method for producing a harness of a connector in a mold by the insert-molding, said harness composed of contacts, wires connected to said contacts and an insulator for holding and fixing therein said contacts connected to said wires, said mold consisting of an upper mold and a lower mold, these upper and lower molds having contact restraining means and wire restraining means for restraining said contacts and said wires in predetermined positions, said method including steps of arranging said contacts connected to said wires in predetermined positions in said lower mold, putting said upper mold on said lower mold and clamping said upper and lower molds, pouring a plastic material into said molds, cooling or heating said plastic material for a predetermined time so as to be solidified or hardened, and removing the solidified or hardened plastic material together with said contacts and wires from said upper and lower molds, according to the invention said upper and lower molds are provided with upper mold holding means and lower mold holding means, respectively, which are located at wire restraining positions of said upper and lower molds and extend into the cavity of said upper and lower molds, and said upper and lower molds are further provided with elastic means arranged to urge said upper and lower holding means in a manner such that said upper and lower mold holding means extend into said cavity of said upper and lower molds to hold said wires before pouring said plastic material into said cavity, but said upper and lower holding means are forced out of the plastic material by its pressure when it is being poured into said cavity of said molds.

Further, the mold for use in the method for producing a harness according to the invention is characterized in that said mold comprises a lower mold having contact restraining means and wire restraining means, and an upper mold to be fitted with said lower mold and having contact restraining means and wire restraining means similarly to said lower mold and further having contact positioning means, and in that said upper mold and said lower mold are provided with upper mold holding means and lower mold holding means, respectively, these upper and lower mold holding means extending into the cavity of said upper and lower molds at opposite positions for restraining said wires, and said upper mold and said lower mold are further provided with elastic means arranged to urge said upper and lower mold holding means into said cavity of said upper and lower molds.

The invention having the subject matters described above can bring about the following significant effects.

The upper and lower mold holding means or members securely hold the wires by the instant when the molten plastic material starts to be poured into the cavity of the upper and lower molds, so that the wires are not bent and not exposed at the surface of the insulator even if they are subjected to the compressive force in their axial directions or subjected to the pressure of the molten plastic material.

The elastic means such as compression springs are arranged to urge the upper mold holding means and the lower mold holding means in a manner such that the upper and lower mold holding means securely hold the wires before pouring the molten plastic material but are forced out of the insulator by the pressure of the molten plastic material being poured into the cavity of the upper and lower molds, thereby obtaining a harness of a connector free from defects.

The mold according to the invention comprises the positioning means, against which the distal ends of contacts can be brought into abutment by applying compressive force to the wires, thereby facilitating the positioning of the contacts.

The invention will be more fully understood by referring to the following detailed specification and claims taken in connection with the appended drawings.

DESCRIPTION OF THE PREFERRED EMBODIMENTS

Figure 1A:
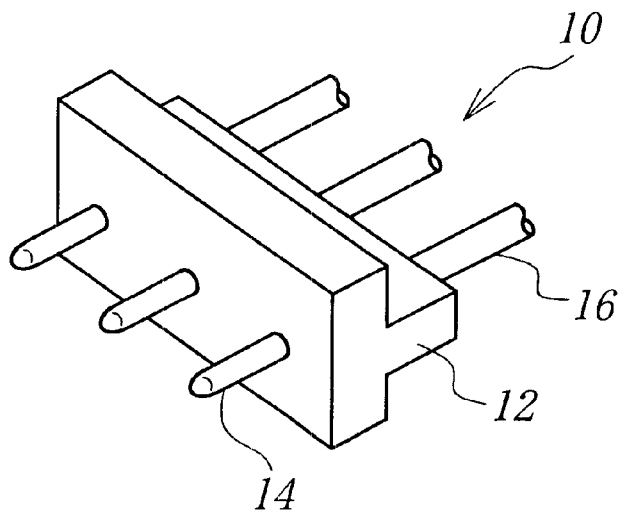
FIG. 1A is a perspective view of a harness of a connector produced by the method according to the invention.
Figure 1B:
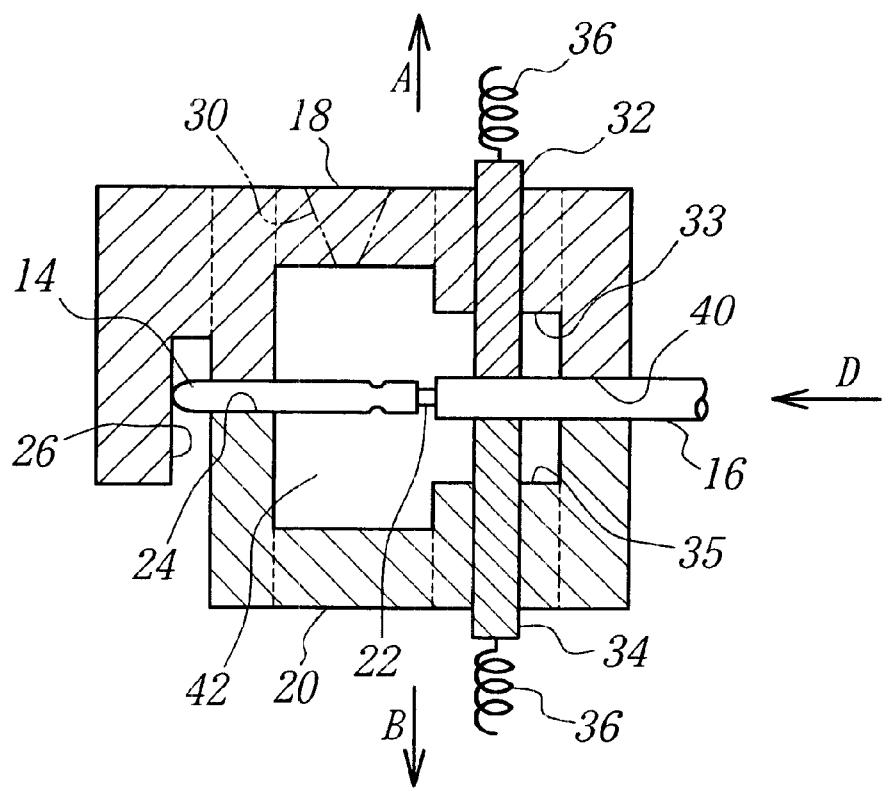
FIG. 1B is a longitudinal sectional view of a mold before a resin is poured into the mold for forming a harness in the method according to the invention.
Figure 2:
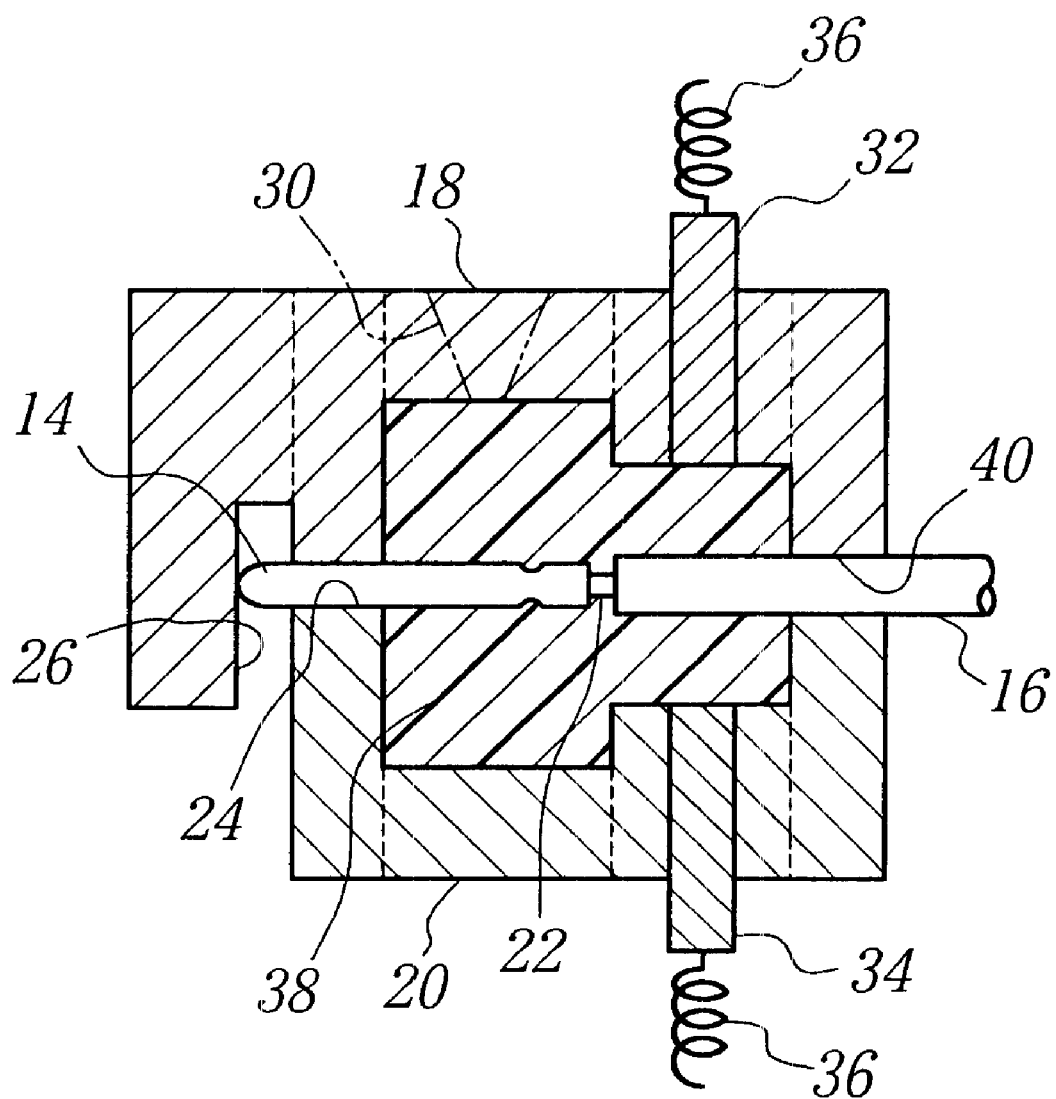
FIG. 2 is a longitudinal sectional view of the mold shown in FIG. 1B after the resin has been poured thereinto.
Figure 3A:
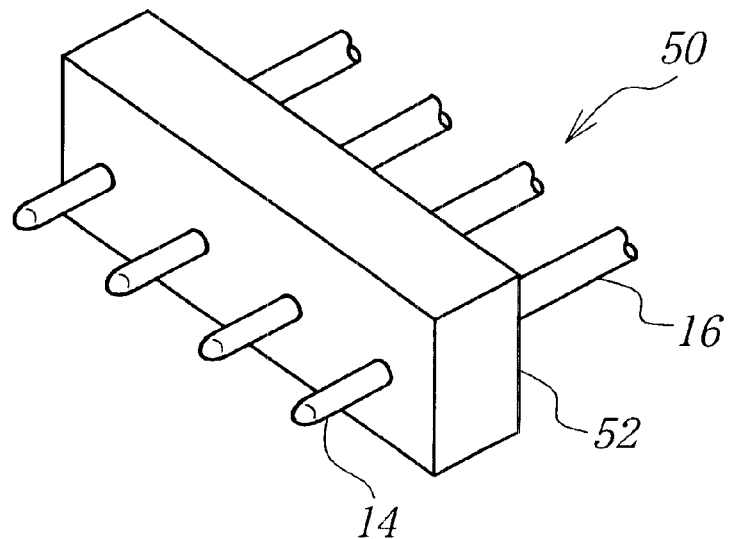
FIG. 3A is a perspective view of a harness of a connector of the prior art.
Figure 3B:
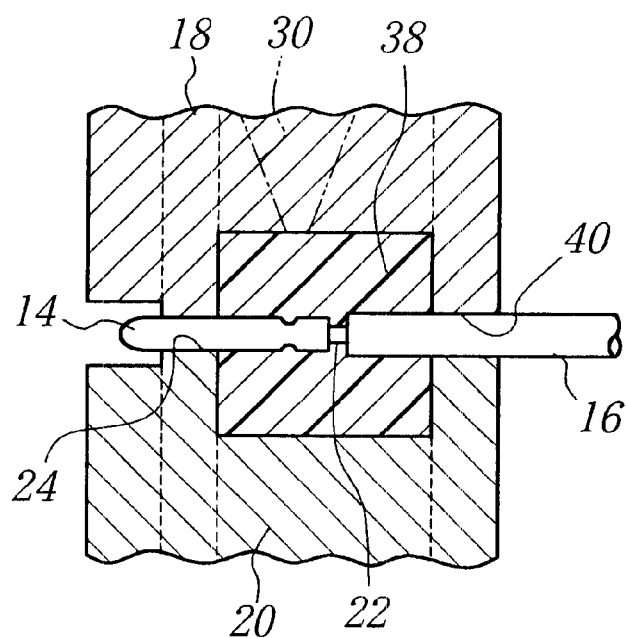
FIG. 3B is a longitudinal sectional view of a mold after a resin has been poured thereinto according to the prior art method.
Figure 4A:
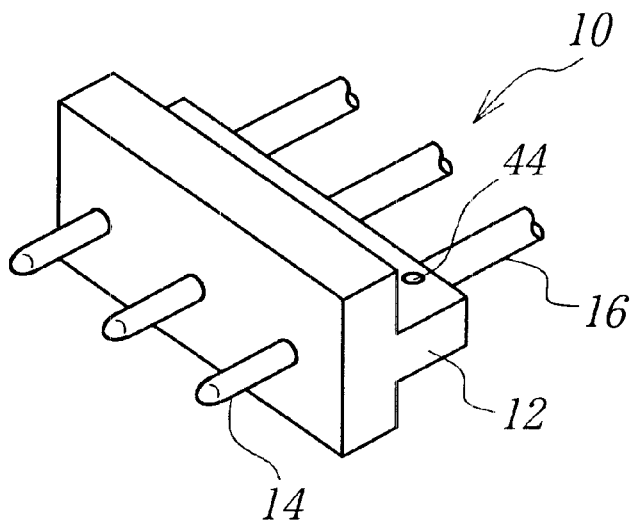
FIG. 4A is a perspective view of a harness having defects produced by the prior art method.
Figure 4B:
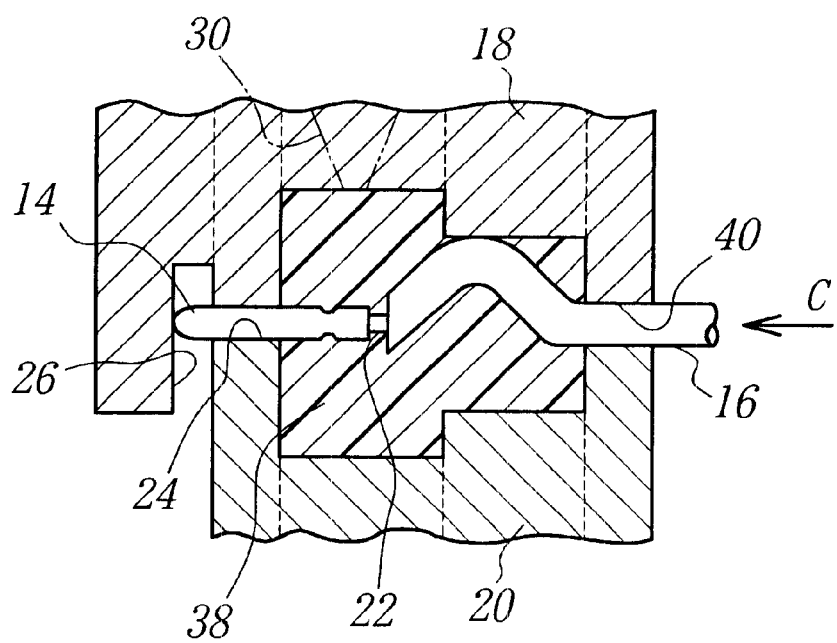
FIG. 4B is a longitudinal sectional view of a mold after a resin has been poured thereinto for producing the harness having the defects shown in FIG. 4A according to the prior art method.

The method for producing a harness according to a preferred embodiment of the present invention will be explained with reference to FIG. 1A illustrating the harness of a connector in a perspective view, FIG. 1B showing a mold in section prior to the pouring of a resin for molding the harness of the connector and FIG. 2 illustrating the mold after the resin has been poured thereinto.

First, the harness 10 of a connector will be briefly explained, which mainly comprises contacts 14, an insulator 12 and wires 16. The contacts 14 are made of a metal and formed as by machining. Materials for the contacts are required to have high electric conductivity and springiness, and examples of such materials are brass, beryllium copper, phosphor bronze and the like. The phosphor bronze is preferable for economic reason.

The insulator 12 is of an insulating plastic material and formed as by molding or the insert-molding. Materials for the insulator 12 are required to have moldability or flowability in molding and heat-resistance, and examples of such materials include polybutylene terephthalate (PBT), polyamide (46PA, 66PA or the like), liquid crystal polymer (LCP), polyphenylene sulfide (PPS) and the like. The liquid crystal polymer (LCP) is preferable in view of the moldability.

The wires 16 are connected to the contacts 14 by means of solderless joining or piercing. The contacts 14 connected to the wires 16 are held and fixed in the insulator 12 as by insert-molding.

The mold will then be explained. The mold generally comprises an upper mold 18 and a lower mold 20. The upper and lower molds 18 and 20 are formed with a desired number of contact restraining means or portions 24 and wire restraining means or portions 40.

The contact restraining portions 24 in opposition to each other of the closed upper and lower molds 18 and 20 form a shape having a cross-section substantially identical with that of the contacts 14. The shape of the contact restraining portions 24 is slightly larger than that of the contacts 14 to leave a clearance of the order of 0.01 mm to 0.03 mm. If the clearance is less than 0.01 mm, the contact restraining portion 24 may cause damage to the contact 14. On the other hand, if the clearance is more than 0.03 mm, there may be a tendency of a molten plastic material to leak through the clearance in the insert-molding.

The wire restraining portions 40 in opposition to each other of the closed upper and lower molds 18 and 20 form a shape having a cross-section substantially identical with that of the wires 16. The shape of the wire restraining portions 40 is slightly smaller than that of the wires 16 with an interfere of the order of 0.05 mm to 0.2 mm. The interference therebetween serves to slightly collapse the wires 16. If the interference is more than 0.2 mm, it may tend to damage the wires 16. The interference is suitably designed in consideration of the hardness of the covering of the wire, the density of the cores 22 of the wire and the like.

In general, the "interference" between two members is a difference in size between, for example, a shaft and an aperture having a size smaller than that of the shaft which is to be fitted in the aperture.

It is sufficient to realize the sizes of the contact and wire restraining portions 24 and 40 with high accuracy described above only over a distance of the order of 0.02 mm measured outwardly from the inner surfaces of the cavity 42 of the molds or from the points at which the contacts 14 and the wires 16 start to contact the insulating plastic material. So long as the restraining portions 24 and 40 have the severe sizes described above over the above distance, remaining portions thereof may have any sizes even greatly deviated from the sizes described above.

The upper mold 18 is provided with positioning means 26 on the side of the contact restraining portions 24 for positioning the distal ends of the contacts 14. In the illustrated embodiment, the positioning means is an L-shaped positioning portion 26. It is easily possible to position the contacts 14 with high accuracy by bringing about the distal ends of the contacts 14 into abutment against the positioning means or portion 26. Although the positioning means 26 is provided on the upper mold 18 in FIG. 1B, it may be provided on the lower mold 20.

The upper mold 18 is further provided with a resin pouring inlet 30 at a predetermined position as shown in dash-dot lines in FIG. 1B. The position of the inlet 30 is suitably determined in consideration of the shape of the harness 10, its application to be used and the like. As an alternative, for example, the inlet 30 may be provided in the upper mold 18 on the side of the wires 16 or on the parting line of the upper and lower molds 18 and 20.

The upper mold 18 is formed on the side of the wire restraining portions 40 with apertures into which upper mold holding means or members 32 are slidably inserted. Elastic means 36 such as compression springs are provided to urge the upper mold holding members 32 into the upper mold 18 so as to normally extend into the cavity of the upper and lower molds 18 and 20.

Similarly to the upper mold 18, the lower mold 20 is formed on the side of the wire restraining portions 40 with apertures into which lower mold holding means or members 34 are slidably inserted, and elastic means 36 such as compression springs are provided to urge the lower mold holding members 34 into the lower mold 20 so as to normally extend into the cavity of the upper and lower molds 18 and 20.

In order to hold the outer ends of the elastic members 36, in the embodiment the upper and lower molds 18 and 20 each are formed integrally with a spring support portion (not shown), and the elastic members 36 are arranged between the upper mold holding members 32 and the spring support portion (not shown) of the upper mold 18 and between the lower mold holding members 34 and spring support member (not shown) of the lower mold 20.

While the upper and lower mold holding members 32 and 34 may have any sizes enabling them to be inserted into the apertures of the molds, these holding members 32 and 34 are so suitably designed that they can hold the wires 16 before the plastic material is poured into the cavity of the molds, but after the plastic material has been completely poured into the cavity the holding members 32 and 34 are forced away from the wires in the directions shown by arrows A and B in FIG. 1B until the inner ends of the holding members 32 and 34 are positioned at the inner surfaces 33 and 35 of the upper and lower molds 18 and 20.

Owing to the existence of the elastic members 36 resiliently urging the upper and lower holding members 32 and 34, before pouring the plastic material into the cavity of the upper and lower molds these holding members 32 and 34 serve to hold the wires 16, and when plastic material is being progressively poured into the cavity of the molds, these holding members 32 and 34 are forced away from the wires 6 by the increasing pressure of the poured plastic material against the resilient force of the elastic members 36.

The strength of the elastic members 36 is so suitably designed that the holding members 32 and 34 are forced away from the wires 16 by the pressure of poured plastic material against the urging force of the elastic members 36. The elastic members 36 may be springs, rubbers, hydraulic or pneumatic cylinders or the like. The springs are preferable in view of their elastic characteristics.

Although the elastic members 36 are shown as the compression springs in FIGS. 1B and 2, other members such as rubbers may be used so long as the required performance described above can be accomplished. While each of the upper and lower molds 18 and 20 is shown as an integral or one-piece mold in the illustrated embodiment, molds separable along the broken lines in FIG. 2 are preferable because of greater ease in fabrication.

Finally, the method for producing a harness according to the invention will be explained. A desired number of contacts 14 connected to respective wires 16 are set in a lower mold 20. An upper mold 18 is then set on the lower mold 20 arranged the contacts 14 connected with respective wires 16 therein, while the wires 16 are urged in the direction shown by an arrow D in FIG. 1B to bring the distal ends of the contacts 14 into contact with the positioning portion 26. This operation is called "mold closing step".

In the closed or clamped condition of the molds, a plastic material is poured through the pouring inlet 30 into the cavity 42 of the molds. Then the plastic material is caused to solidify or harden by cooling or heating. After solidification or hardened the upper mold 18 is removed from the lower mold 20. This operation is called "mold opening step". Under this condition, the molded harness is taken out of the lower mold 20.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A mold for manufacturing a harness comprising a lower mold having contact restraining means and wire restraining means, and an upper mold to be fitted with said lower mold and having contact restraining means and wire restraining means similarly to said lower mold, wherein said lower mold or said upper mold further comprises contact positioning means, and wherein said upper mold and said lower mold are provided with upper mold holding means and lower mold holding means, respectively, these upper and lower holding means extending into the cavity formed between said upper and lower molds at opposite positions for restraining said wires, wherein said upper mold and said lower mold are further provided with elastic means arranged to urge said upper and lower mold holding means into said cavity of said upper and lower molds, and wherein said contact positioning means has an L-shaped cross-section and arranged on the side of said contact restraining means so that the distal ends of the contacts can be brought into contact with said positioning means to position said contacts when they are set into the mold.

2. A mold for manufacturing a harness comprising a lower mold having contact restraining means and wire restraining means, and an upper mold to be fitted with said lower mold and having contact restraining means and wire restraining means similarly to said lower mold, wherein said lower mold or said upper mold further comprises contact positioning means, and wherein said upper mold and said lower mold are provided with upper mold holding means and lower mold holding means, respectively, these upper and lower holding means extending into the cavity formed between said upper and lower molds at opposite positions for restraining said wires, wherein said upper mold and said lower mold are further provided with elastic means arranged to urge said upper and lower mold holding means into said cavity of said upper and lower molds, and wherein said contact restraining means of the closed upper and lower molds are so constructed to form a shape having a cross-section substantially identical with but slightly larger than that of the contacts with a clearance therebetween of the order of 0.01 mm to 0.03 mm.

3. A mold for manufacturing a harness comprising a lower mold having contact restraining means and wire restraining means, and an upper mold to be fitted with said lower mold and having contact restraining means and wire restraining means similarly to said lower mold, wherein said lower mold or said upper mold further comprises contact positioning means, and wherein said upper mold and said lower mold are provided with upper mold holding means and lower mold holding means, respectively, these upper and lower holding means extending into the cavity formed between said upper and lower molds at opposite positions for restraining said wires, wherein said upper mold and said lower mold are further provided with elastic means arranged to urge said upper and lower mold holding means into said cavity of said upper and lower molds, and wherein said wire restraining means of the closed upper and lower molds are so constructed to form a shape having a cross-section substantially identical with but slightly smaller than that of said wires with an interference therebetween of the order of 0.05 mm to 0.2 mm.

4. The mold as set forth in claim 2 or 3, wherein said clearance or interference extends only over a distance of the order of 0.02 mm measured outwardly from inner surfaces of said cavity of said upper and lower molds.

* * * * *